United States Patent
Lam et al.

(10) Patent No.: US 9,831,768 B2
(45) Date of Patent: *Nov. 28, 2017

(54) DYNAMIC MANEUVERING CONFIGURATION FOR MULTIPLE CONTROL MODES IN A UNIFIED SERVO SYSTEM

(71) Applicant: Crane Electronics, Inc., Redmond, WA (US)

(72) Inventors: Cuon Lam, Renton, WA (US); Sovann Song, Bothell, WA (US); Khoa Nguyen, Seattle, WA (US)

(73) Assignee: CRANE ELECTRONICS, INC., Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/787,565

(22) PCT Filed: May 29, 2015

(86) PCT No.: PCT/US2015/033321
§ 371 (c)(1),
(2) Date: Oct. 28, 2015

(87) PCT Pub. No.: WO2016/010637
PCT Pub. Date: Jan. 21, 2016

(65) Prior Publication Data
US 2016/0261194 A1    Sep. 8, 2016

Related U.S. Application Data

(63) Continuation of application No. 14/333,705, filed on Jul. 17, 2014, now Pat. No. 9,041,378.

(51) Int. Cl.
*H02M 3/156* (2006.01)
*H02M 3/158* (2006.01)
*H02M 1/00* (2006.01)

(52) U.S. Cl.
CPC .......... *H02M 3/156* (2013.01); *H02M 3/158* (2013.01); *H02M 3/1588* (2013.01); *H02M 2001/0025* (2013.01)

(58) Field of Classification Search
CPC ......... H02M 2001/0025; H02M 3/156; H02M 3/158; H02M 3/1588
See application file for complete search history.

(56) References Cited

U.S. PATENT DOCUMENTS 3,144,627 A    8/1964    Dunnabeck et al.
3,201,728 A    8/1965    McWhirter
(Continued)

FOREIGN PATENT DOCUMENTS

CN    2307390 Y    2/1999
CN    101326705 A    12/2008
(Continued)

OTHER PUBLICATIONS

"EMI Suppression Filters (EMIFIL®) for AC Power Lines," Murata Manufacturing Co., Ltd., Cat. No. C09E-14, downloaded on Feb. 21, 2014, 27 pages.
(Continued)

*Primary Examiner* — Timothy J Dole
*Assistant Examiner* — Ishrat Jamali
(74) *Attorney, Agent, or Firm* — Seed IP Law Group LLP (57) ABSTRACT

Systems and methods that provide control circuits having multiple sub-control inputs that control operation of a power electronics device (e.g., a power converter). Each of the multiple sub-control inputs are output from a separate sub-control circuit that includes a feedback circuit having an input tied to a common control node. The common control node is coupled to an input of a controller (e.g., a PWM controller). Outputs of each of the sub-control circuits are coupled to the common control node by a respective switch (Continued)

(e.g., diode, transistor, etc.) so that each of the sub-control circuits may be selectively coupled to the common control node to provide a control signal to a controller. Since components of each of the feedback compensations circuits are biased at a regulation voltage instead of a higher power supply voltage, the control circuit may switch between control modes with minimal delay.

9 Claims, 5 Drawing Sheets

(56) References Cited

U.S. PATENT DOCUMENTS

| | | |
|---|---|---|
| 3,699,424 A | 10/1972 | Hart et al. |
| 3,831,080 A | 8/1974 | Zabert et al. |
| 3,886,433 A | 5/1975 | Watanabe |
| 4,128,868 A | 12/1978 | Gamble |
| 4,255,784 A | 3/1981 | Rosa |
| 4,337,569 A | 7/1982 | Pierce |
| 4,354,162 A | 10/1982 | Wright |
| 4,482,945 A | 11/1984 | Wolf et al. |
| 4,533,986 A | 8/1985 | Jones |
| 4,618,812 A | 10/1986 | Kawakami |
| 4,635,002 A | 1/1987 | Riebeek |
| 4,683,527 A | 7/1987 | Rosa |
| 4,719,552 A | 1/1988 | Albach et al. |
| 4,743,835 A | 5/1988 | Bossé et al. |
| 4,813,126 A | 3/1989 | Williamson |
| 4,814,735 A | 3/1989 | Williamson |
| 4,833,437 A | 5/1989 | Williamson |
| 4,837,535 A | 6/1989 | Konishi et al. |
| 4,920,309 A | 4/1990 | Szepesi |
| 4,956,626 A | 9/1990 | Hoppe et al. |
| 4,992,919 A | 2/1991 | Lee et al. |
| 5,031,066 A | 7/1991 | Wagner et al. |
| 5,068,774 A | 11/1991 | Rosa |
| 5,148,357 A | 9/1992 | Paice |
| 5,329,695 A | 7/1994 | Traskos et al. |
| 5,343,383 A | 8/1994 | Shinada et al. |
| 5,396,165 A | 3/1995 | Hwang et al. |
| 5,418,502 A | 5/1995 | Ma et al. |
| 5,430,640 A | 7/1995 | Lee |
| 5,436,550 A | 7/1995 | Arakawa |
| 5,469,124 A | 11/1995 | O'Donnell et al. |
| 5,481,225 A | 1/1996 | Lumsden et al. |
| 5,521,807 A | 5/1996 | Chen et al. |
| 5,631,822 A | 5/1997 | Silberkleit et al. |
| 5,638,262 A | 6/1997 | Brown |
| 5,691,629 A | 11/1997 | Belnap |
| 5,694,303 A | 12/1997 | Silberkleit et al. |
| 5,708,571 A | 1/1998 | Shinada |
| 5,734,563 A | 3/1998 | Shinada |
| 5,774,347 A | 6/1998 | Nakanishi |
| 5,777,866 A | 7/1998 | Jacobs et al. |
| 5,831,418 A | 11/1998 | Kitagawa |
| 5,903,504 A | 5/1999 | Chevallier et al. |
| 5,917,716 A | 6/1999 | Cho |
| 5,963,438 A | 10/1999 | Chen |
| 6,002,183 A | 12/1999 | Iversen et al. |
| 6,002,318 A | 12/1999 | Werner et al. |
| 6,038,148 A | 3/2000 | Farrington et al. |
| 6,043,705 A | 3/2000 | Jiang |
| 6,091,616 A | 7/2000 | Jacobs et al. |
| 6,101,104 A | 8/2000 | Eng |
| 6,137,373 A | 10/2000 | Mori |
| 6,141,232 A | 10/2000 | Weinmeier et al. |
| 6,157,180 A | 12/2000 | Kuo |
| 6,157,282 A | 12/2000 | Hopkinson |
| 6,169,674 B1 | 1/2001 | Owen |
| 6,191,964 B1 | 2/2001 | Boylan et al. |
| 6,198,647 B1 | 3/2001 | Zhou et al. |
| 6,232,832 B1 | 5/2001 | Kirkpatrick, II |
| 6,236,197 B1 | 5/2001 | Manabe et al. |
| 6,252,781 B1 | 6/2001 | Rinne et al. |
| 6,304,463 B1 | 10/2001 | Krugly |
| 6,335,872 B1 | 1/2002 | Zhou et al. |
| 6,343,026 B1 | 1/2002 | Perry |
| 6,456,511 B1 | 9/2002 | Wong |
| 6,469,478 B1 | 10/2002 | Curtin |
| 6,472,852 B1 | 10/2002 | Lethellier |
| 6,487,097 B2 | 11/2002 | Popescu |
| 6,490,183 B2 | 12/2002 | Zhang |
| 6,492,890 B1 | 12/2002 | Woznlczka |
| 6,545,534 B1 | 4/2003 | Mehr |
| 6,563,719 B1 | 5/2003 | Hua et al. |
| 6,617,948 B2 | 9/2003 | Kuroshima et al. |
| 6,618,274 B2 | 9/2003 | Boylan et al. |
| 6,643,151 B1 | 11/2003 | Nebrigic et al. |
| 6,664,660 B2 | 12/2003 | Tsai |
| 6,697,955 B1 | 2/2004 | Malik et al. |
| 6,707,650 B2 | 3/2004 | Diallo et al. |
| 6,711,039 B2 | 3/2004 | Brkovic |
| 6,734,775 B2 | 5/2004 | Chung |
| 6,760,235 B2 | 7/2004 | Lin et al. |
| 6,798,177 B1 | 9/2004 | Liu et al. |
| 6,839,246 B1 | 1/2005 | Zhang et al. |
| 6,850,048 B2 | 2/2005 | Orr et al. |
| 6,998,901 B2 | 2/2006 | Lee |
| 7,012,413 B1 | 3/2006 | Ye |
| 7,046,492 B2 | 5/2006 | Fromm et al. |
| 7,061,212 B2 | 6/2006 | Phadke |
| 7,095,215 B2 | 8/2006 | Liu et al. |
| 7,129,808 B2 | 10/2006 | Roebke et al. |
| 7,164,584 B2 | 1/2007 | Walz |
| 7,183,727 B2 | 2/2007 | Ferguson et al. |
| 7,199,563 B2 | 4/2007 | Ikezawa |
| 7,202,644 B2 | 4/2007 | Nitta et al. |
| 7,206,210 B2 * | 4/2007 | Harnett .............. H02M 1/32 |
| | | 363/80 |
| 7,212,416 B2 | 5/2007 | Kyono |
| 7,224,590 B2 | 5/2007 | Lin |
| 7,227,754 B2 | 6/2007 | Greiesinger et al. |
| 7,286,376 B2 | 10/2007 | Yang |
| 7,304,828 B1 | 12/2007 | Shvartsman |
| 7,339,804 B2 | 3/2008 | Uchida |
| 7,369,024 B2 | 5/2008 | Yargole et al. |
| 7,443,278 B2 | 10/2008 | Kawahata et al. |
| 7,480,158 B2 | 1/2009 | Moromizato et al. |
| 7,515,005 B2 | 4/2009 | Dan |
| 7,564,706 B1 | 7/2009 | Herbert |
| 7,577,539 B2 | 8/2009 | Hubanks et al. |
| 7,579,901 B2 | 8/2009 | Yamashita |
| 7,602,273 B2 | 10/2009 | Yoshikawa |
| 7,616,459 B2 | 11/2009 | Huynh et al. |
| 7,616,464 B2 | 11/2009 | Phadke et al. |
| 7,663,896 B2 | 2/2010 | Na |
| 7,730,981 B2 | 6/2010 | McCabe et al. |
| 7,742,318 B2 | 6/2010 | Fu et al. |
| 7,773,392 B2 | 8/2010 | Matsumoto |
| 7,786,712 B2 | 8/2010 | Williams |
| 7,847,519 B2 | 12/2010 | Ho |
| 7,884,317 B2 | 2/2011 | Casper |
| 7,893,804 B2 | 2/2011 | Kaveh Ahangar et al. |
| 7,933,131 B2 | 4/2011 | Cho et al. |
| 8,009,004 B2 | 8/2011 | Ahangar et al. |
| 8,040,699 B2 | 10/2011 | Huynh et al. |
| 8,067,992 B2 | 11/2011 | Chen et al. |
| 8,072,195 B2 | 12/2011 | Aan De Stegge et al. |
| 8,102,162 B2 | 1/2012 | Moussaoui et al. |
| 8,233,293 B2 | 7/2012 | Selvaraju et al. |
| 8,279,631 B2 | 10/2012 | Yang |
| 8,350,659 B2 | 1/2013 | Dziubek et al. |
| 8,358,118 B2 | 1/2013 | Chen et al. |
| 8,373,403 B1 | 2/2013 | Radovic |
| 8,378,647 B2 | 2/2013 | Yonezawa et al. |
| 8,508,195 B2 | 8/2013 | Uno |
| 8,520,415 B1 | 8/2013 | Krishnamoorthy et al. |
| 8,552,589 B2 | 10/2013 | Ghosh et al. |
| 8,570,006 B2 | 10/2013 | Moussaoui et al. |
| 8,649,128 B2 | 2/2014 | Wang et al. |
| 8,710,820 B2 | 4/2014 | Parker |
| 8,736,240 B2 | 5/2014 | Liu et al. |
| 8,760,082 B2 | 6/2014 | Yang et al. |

(56) References Cited

U.S. PATENT DOCUMENTS

| | | |
|---|---|---|
| 8,764,247 B2 | 7/2014 | Pattekar et al. |
| 8,810,214 B2 | 8/2014 | Van Dijk et al. |
| 8,824,167 B2 | 9/2014 | Hughes et al. |
| 8,829,868 B2 | 9/2014 | Waltman et al. |
| 8,866,551 B2 | 10/2014 | Lam et al. |
| 8,873,263 B2 | 10/2014 | Feng et al. |
| 8,885,308 B2 | 11/2014 | Waltman et al. |
| 8,890,630 B2 | 11/2014 | Hughes |
| 9,030,178 B2 | 5/2015 | Chang et al. |
| 9,041,378 B1 | 5/2015 | Lam et al. |
| 9,106,142 B2 | 8/2015 | Huang et al. |
| 9,160,228 B1 | 10/2015 | Parker et al. |
| 9,230,726 B1 | 1/2016 | Parker et al. |
| 9,293,999 B1 | 3/2016 | Lam et al. |
| 2002/0015320 A1 | 2/2002 | Mochikawa et al. |
| 2002/0071300 A1 | 6/2002 | Jang et al. |
| 2004/0125523 A1 | 7/2004 | Edwards et al. |
| 2004/0169498 A1 | 9/2004 | Goder et al. |
| 2004/0178776 A1 | 9/2004 | Hansen et al. |
| 2004/0178846 A1 | 9/2004 | Kuyel et al. |
| 2006/0039172 A1 | 2/2006 | Soldano |
| 2006/0132105 A1 | 6/2006 | Prasad et al. |
| 2006/0132272 A1 | 6/2006 | Kitahara et al. |
| 2006/0212138 A1 | 9/2006 | Zhang |
| 2006/0220629 A1 | 10/2006 | Saito et al. |
| 2006/0227582 A1 | 10/2006 | Wei et al. |
| 2007/0152644 A1 | 7/2007 | Vinn |
| 2007/0257733 A1 | 11/2007 | Laletin |
| 2008/0024951 A1 | 1/2008 | Mortensen et al. |
| 2008/0031014 A1 | 2/2008 | Young |
| 2008/0150670 A1 | 6/2008 | Chung et al. |
| 2008/0174396 A1 | 7/2008 | Choi et al. |
| 2008/0186121 A1 | 8/2008 | Kawahata et al. |
| 2008/0197724 A1 | 8/2008 | Cullen et al. |
| 2008/0303606 A1 | 12/2008 | Liu et al. |
| 2009/0067206 A1 | 3/2009 | Oguchi et al. |
| 2009/0128110 A1 | 5/2009 | DeLurio et al. |
| 2009/0154204 A1 | 6/2009 | Taylor |
| 2009/0167432 A1 | 7/2009 | van den Heuvel |
| 2009/0174381 A1 | 7/2009 | Ojanen et al. |
| 2009/0213623 A1 | 8/2009 | Yang |
| 2009/0231029 A1 | 9/2009 | Randlett |
| 2009/0237057 A1 | 9/2009 | Dishman et al. |
| 2009/0256547 A1 | 10/2009 | Akyildiz et al. |
| 2009/0273431 A1 | 11/2009 | Hurst |
| 2009/0302775 A1 | 12/2009 | Alexandrov |
| 2009/0321045 A1 | 12/2009 | Hernon et al. |
| 2009/0321046 A1 | 12/2009 | Hernon et al. |
| 2010/0008112 A1 | 1/2010 | Feng et al. |
| 2010/0014330 A1 | 1/2010 | Chang et al. |
| 2010/0117715 A1 | 5/2010 | Ariyama |
| 2010/0176755 A1 | 7/2010 | Hoadley et al. |
| 2010/0253309 A1 | 10/2010 | Xi et al. |
| 2011/0090038 A1 | 4/2011 | Perchlik |
| 2011/0103105 A1 | 5/2011 | Wei et al. |
| 2011/0169471 A1 | 7/2011 | Nagasawa |
| 2012/0268227 A1 | 10/2012 | Howes et al. |
| 2013/0021008 A1 | 1/2013 | Hume et al. |
| 2013/0049918 A1 | 2/2013 | Fu et al. |
| 2013/0121043 A1 | 5/2013 | Pietkiewicz |
| 2013/0201631 A1 | 8/2013 | Parker et al. |
| 2013/0245854 A1 | 9/2013 | Rinne et al. |
| 2013/0299148 A1 | 11/2013 | Hernon et al. |
| 2014/0015629 A1 | 1/2014 | Zeng et al. |
| 2014/0016356 A1 | 1/2014 | Furmanczyk et al. |
| 2014/0118946 A1 | 5/2014 | Tong et al. |
| 2014/0192561 A1 | 7/2014 | Plesnik |
| 2014/0292288 A1 | 10/2014 | Yan et al. |
| 2014/0327417 A1 | 11/2014 | Zhu et al. |
| 2015/0137412 A1 | 5/2015 | Schalansky |
| 2015/0229149 A1 | 8/2015 | Fahlenkamp et al. |
| 2016/0261194 A1 | 9/2016 | Lam et al. |

FOREIGN PATENT DOCUMENTS

| | | |
|---|---|---|
| CN | 201219235 Y | 4/2009 |
| CN | 103582997 A | 2/2014 |
| CN | 104704742 A | 6/2015 |
| EP | 1 933 340 A1 | 6/2008 |
| GB | 1071469 A | 6/1967 |
| GB | 1114013 A | 5/1968 |
| JP | 55-1761 A | 1/1980 |
| JP | 55-130208 A | 10/1980 |
| JP | 62-32714 A | 2/1987 |
| JP | 2567069 B2 | 6/1993 |
| JP | 8-78252 A | 3/1996 |
| JP | 2001-320250 A | 11/2001 |
| JP | 2002-076799 A | 3/2002 |
| JP | 2002-335674 A | 11/2002 |
| JP | 2003-173913 A | 6/2003 |
| JP | 2007-215359 A | 8/2007 |
| JP | 2007-263944 A | 10/2007 |
| JP | 2008-185389 A | 8/2008 |
| JP | 2009-81952 A | 4/2009 |
| JP | 2009-100120 A | 5/2009 |
| JP | 2009-106012 A | 5/2009 |
| JP | 5030216 B2 | 9/2012 |
| KR | 10-2007-0118409 A | 12/2007 |
| KR | 2008-019196 A | 3/2008 |
| KR | 2008-101784 A | 11/2008 |
| KR | 10-2009-0075465 A | 7/2009 |
| KR | 10-2013-0026714 A | 3/2013 |
| WO | 99/41957 A1 | 8/1999 |
| WO | 01/22444 A1 | 3/2001 |
| WO | 02/097974 A2 | 12/2002 |
| WO | 2011/123680 A2 | 10/2011 |
| WO | 2012/100810 A1 | 8/2012 |
| WO | 2012/116263 A1 | 8/2012 |
| WO | 2014/039982 A1 | 3/2014 |
| WO | 2014/103298 A1 | 7/2014 |
| WO | 2014/152415 A1 | 9/2014 |
| WO | 2017/015143 A1 | 1/2017 |

OTHER PUBLICATIONS

"Application Guide: Theory of Operation," MicroPower Direct, URL=http://micropowerdirect.com/PDF%20Files/Application%20Notes/Power%20Supply%20Theory%20of%20Operation.pdf, download date Apr. 18, 2012, 6 pages.

"Buck converter," URL=http://en.wikipedia.org/wiki/Buck_converter, download date Jun. 23, 2011, 14 pages.

"Maximum Flexible Power (MFP) Single Output Point of Load: Technical Preview—3-6 VDC IN, 7 AMP, Non-Isolated DC/DC Converter," Crane Aerospace & Electronics Power Solutions, 2010, 17 pages.

"Step-gap "E" core swing chokes: Improved regulation and higher efficiency are possible when operating at minimum current levels," Technical Bulletin: Bulletin FC-S4, Magnetics Division, Spang & Company, Butler, Pennsylvania, 2001, 4 pages.

"Synchronous Rectification Aids Low-Voltage Power Supplies," Maxim Integrated Products, URL=http://www.maxim-ic.com/app-notes/index.mvp/id/652, download date Jun. 22, 2011, 6 pages.

Beta Dyne, "Synchronous Rectification," Application Note DC-006, DC/DC Converters, 2002, 3 pages.

Bottrill, "The Effects of Turning off a Converter with Self-Driven Synchronous Rectifiers," Power Guru, May 1, 2007, retrieved from http://www.powerguru.org/the-effects-of-turning-off-a-converter-with-self-driven-synchronous-rectifiers/ Jul. 10, 2015, 6 pages.

Chinese Office Action, dated May 22, 2015, for Chinese Application No. 201280016631.1, 15 pages. (with Partial English Translation).

Coates, "Power supplies—3.0 Switched Mode Power Supplies," www.learnabout-electronics.org, 2007-2013, 20 pages.

Cuon et al., "Dynamic Maneuvering Configuration of Multiple Control Modes in a Unified Servo System," Amendment filed Mar. 6, 2015, for U.S. Appl. No. 14/333,705, 11 pages.

eCircuit Center, "Op Amp Offset Adjustment," 2002, retrieved from http://www.ecircuitcenter.com/Circuits/op_voff/op_voff2.htm on Mar. 26, 2012, 3 pages.

(56) References Cited

OTHER PUBLICATIONS eCircuit Center, "Op Amp Offset Voltage," 2002, retrieved from http://www.ecircuitcenter.com/Circuits/op_voff/op_voff.htm on Mar. 26, 2012, 3 pages.
Hughes et al., "Self Synchronizing Power Converter Apparatus and Method Suitable for Auxiliary Bias for Dynamic Load Applications," Notice of Allowance dated May 14, 2014, for U.S. Appl. No. 13/185,217, 10 pages.
Hughes, "Oscillator Apparatus and Method With Wide Adjustable Frequency Range," Office Action dated Jun. 5, 2013, for U.S. Appl. No. 13/185,152, 17 pages.
Hughes, "Oscillator Apparatus and Method With Wide Adjustable Frequency Range," Amendment filed Oct. 7, 2013, for U.S. Appl. No. 13/185,152, 15 pages.
Hughes, "Oscillator Apparatus and Method With Wide Adjustable Frequency Range," Office Action dated Jan. 28, 2014, for U.S. Appl. No. 13/185,152, 15 pages.
Hughes, "Oscillator Apparatus and Method With Wide Adjustable Frequency Range," Amendment filed Apr. 24, 2014, for U.S. Appl. No. 13/185,152, 8 pages.
Hughes, "Oscillator Apparatus and Method With Wide Adjustable Frequency Range," Notice of Allowance dated Jul. 14, 2014, for U.S. Appl. No. 13/185,152, 12 pages.
Hume et al., "Power Converter Apparatus and Method With Compensation for Light Load Conditions," Office Action dated Nov. 6, 2013, for U.S. Appl. No. 13/185,142, 11 pages.
International Search Report, dated Aug. 31, 2015 for PCT/US2015/033321, 9 pages.
International Search Report, dated Dec. 20, 2013, for PCT/US2013/058784, 3 pages.
International Search Report, dated Oct. 14, 2011, for PCT/US2011/030778, 3 pages.
Jovanović et al., "Design Considerations for Forward Converter with Synchronous Rectifiers," Power Conversion Proceedings, pp. 340-350, Oct. 1993.
King et al., "Active Clamp Control Boosts Forward Converter Efficiency," *Power Electronics Technology*, pp. 52-55, Jun. 2003.
Kristjansson et al., "Solutions to Today's Low Voltage Power Design Challenges Using High-Efficiency, Non-Isolated Point of Load Converters: A Discussion of the Interpoint™ MFP Series™ Point of Load Converter," Crane Aerospace & Electronics, Power Solutions—Interpoint Products, Redmond, WA, Oct. 2011, Revised Jan. 2012, 25 pages.
Lam et al., "Dynamic Maneuvering Configuration for Multiple Control Modes in a Unified Servo System," Office Action dated Dec. 23, 2014, for U.S. Appl. No. 14/333,705, 6 pages.
Lam et al., "Automatic Enhanced Self-Driven Synchronous Rectification for Power Converters," Notice of Allowance, for U.S. Appl. No. 14/848,859, dated Dec. 10, 2015, 29 pages.
Lam et al., "Automatic Enhanced Self-Driven Synchronous Rectification for Power Converters," U.S. Appl. No. 14/848,859, filed Sep. 9, 2015, 53 pages.
Lam et al., "Automatic Enhanced Self-Driven Synchronous Rectification for Power Converters for Wide Input Range and High Output Voltage Without Tertiary Winding," U.S. Appl. No. 62/193,755, filed Jul. 17, 2015, 53 pages.
Lam et al., "Impedance Compensation for Operational Amplifiers Used in Variable Environments," Office Action dated Feb. 7, 2014, for U.S. Appl. No. 13/609,107, 11 pages.
Lam et al., "Impedance Compensation for Operational Amplifiers Used in Variable Environments," Amendment filed May 6, 2014, for U.S. Appl. No. 13/609,107, 12 pages.
Lam et al., "Impedance Compensation for Operational Amplifiers Used in Variable Environments," Notice of Allowance dated Jun. 27, 2014, for U.S. Appl. No. 13/609,107, 9 pages.
Manfredi et al., "Additive Manufacturing of Al Alloys and Aluminium Matrix Composites (AMCs)," in Monteiro (ed.), *Light Metal Alloys Applications*, InTech, Jun. 11, 2014, 32 pages.
Mappus, "Synchronous Rectification for Forward Converters," Fairchild Semiconductor Power Seminar 2010-2011, 19 pages.

Merriam-Webster, "Directly," retrieved from http://www.merriam-webster.com/dictionary/directly, on Nov. 6, 2012, 1 page.
Michael T. Zhang, *Synchronous Rectification, Paralleling, Interleaving, Thermal*, Chapter Two, "Synchronous Rectification," pp. 9-72, PDF created Feb. 20, 1997.
Mitsuya, "Basics of Noise Countermeasures—Lesson 14: Using Common Mode Choke Coils for Power Supply Lines," Murata Manufacturing Co., Ltd., Oct. 28, 2014, retrieved on Feb. 4, 2015, from http://www.murata.com/en-eu/products/emiconfun/emc/2014/10/28/en-20141028-p1, 3 pages.
Ng, "Implementing Constant Current Constant Voltage AC Adapter by NCP1200 and NCP4300A," ON Semiconductor, Application Note, Publication Order No. AND8042/D, Feb. 2001, 12 pages.
Nguyen et al., "Nulling Input Offset Voltage of Operational Amplifiers," Mixed Signal Products, Texas Instruments—Application Report SLOA045, Aug. 2000, pp. 1-15.
Parker et al., "Transformer-Based Power Converters With 3D Printed Microchannel Heat Sink," Office Action, dated Aug. 3, 2015, for U.S. Appl. No. 14/627,556, 11 pages.
Parker et al., "Integrated Tri-State Electromagnetic Interference Filter and Line Conditioning Module," Office Action dated Apr. 24, 2015, for U.S. Appl. No. 14/632,818, 11 pages.
Parker et al., "Transformer-Based Power Converters With 3D Printed Microchannel Heat Sink," Office Action dated Apr. 16, 2015, for U.S. Appl. No. 14/627,556, 9 pages.
Parker, "Switched Capacitor Hold-Up Scheme for Constant Boost Output Voltage," Office Action dated Mar. 28, 2012, for U.S. Appl. No. 12/751,067, 16 pages.
Parker, "Switched Capacitor Hold-Up Scheme for Constant Boost Output Voltage," Amendment filed Jul. 30, 2012, for U.S. Appl. No. 12/751,067, 18 pages.
Parker, "Switched Capacitor Hold-Up Scheme for Constant Boost Output Voltage," Office Action dated Nov. 16, 2012, for U.S. Appl. No. 12/751,067, 20 pages.
Parker, "Switched Capacitor Hold-Up Scheme for Constant Boost Output Voltage," Amendment filed Jan. 16, 2013, for U.S. Appl. No. 12/751,067, 15 pages.
Parker, "Switched Capacitor Hold-Up Scheme for Constant Boost Output Voltage," Amendment filed Feb. 15, 2013, for U.S. Appl. No. 12/751,067, 15 pages.
Parker, "Switched Capacitor Hold-Up Scheme for Constant Boost Output Voltage," Office Action dated Jul. 30, 2013, for U.S. Appl. No. 12/751,067, 18 pages.
Parker, "Switched Capacitor Hold-Up Scheme for Constant Boost Output Voltage," Amendment filed Oct. 30, 2013, for U.S. Appl. No. 12/751,067, 19 pages.
Parker, "Switched Capacitor Hold-Up Scheme for Constant Boost Output Voltage," Notice of Allowance dated Feb. 3, 2014, for U.S. Appl. No. 12/751,067, 11 pages.
Pascu, "Error Amplifier with Forced Equilibrium Adaptor," Kepco, Inc., retrieved from http://www.kepcopower.com/equibm2.htm#fig2, dated May 22, 2014, 8 pages.
Peter, "Synchronous rectifier in DC/DC converters," Oct. 5, 2009, retrieved from http://www.posterus.sk/?p=2535, on Jul. 10, 2015, 11 pages.
Plesnik, "A New Method for Driving Synchronous Rectifiers," IEICE/IEEE INTELEC'03, Oct. 19-23, Yokohama, Japan, pp. 274-281, 2003.
Shrisavar, "Introduction to Power Management," Texas Instruments, Biracha Digital Power Ltd., 2014, 37 pages.
Waltman et al., "Input Control Apparatus and Method With Inrush Current, Under and Over Voltage Handling," Office Action dated Jun. 17, 2014, for U.S. Appl. No. 13/185,210, 8 pages.
Waltman et al., "Power Converter Apparatus and Method With Compensation for Current Limit/Current Share Operation," Office Action dated Dec. 17, 2013, for U.S. Appl. No. 13/185,172, 15 pages.
Waltman et al., "Power Converter Apparatus and Method With Compensation for Current Limit/Current Share Operation," Amendment filed Mar. 17, 2014, for U.S. Appl. No. 13/185,172, 16 pages.

(56) References Cited

OTHER PUBLICATIONS

Waltman et al., "Power Converter Apparatus and Method With Compensation for Current Limit/Current Share Operation," Notice of Allowance dated May 8, 2014, for U.S. Appl. No. 13/185,172, 10 pages.
Waltman et al., "Power Converter Apparatus and Methods," U.S. Appl. No. 61/508,937, filed Jul. 18, 2011, 139 pages.
Written Opinion, dated Dec. 20, 2013, for PCT/US2013/058784, 4 pages.
Written Opinion, dated Oct. 14, 2011, for PCT/US2011/030778, 5 pages.
Xing et al., "Power System Architecture with Back-Up Power for Servers," ERC Program of the National Science Foundation, 5 pages.
"Application Note 664 Feedback Isolation Augments Power-Supply Safety and Performance," Maxim Integrated, Jan. 22, 2001, retrieved from https://www.maximintegrated.com/en/app-notes/index.mvp/id/664, 6 pages.
Dixon, "Unitrode Application Note Average Current Mode Control of Switching Power Supplies," Texas Instruments Inc., 1999.
Extended European Search Report, dated Apr. 15, 2016 for corresponding European Application No. 13835620.9, 7 pages.
Furmanczyk et al., "AC/DC Power Conversion System and Method of Manufacture of the Same," Notice of Allowance, dated Apr. 25, 2016, for U.S. Appl. No. 14/001,312, 9 pages.
Irving et al., "Analysis and Design Optimization of Magnetic-Feedback Control Using Amplitude Modulation," *IEEE Transactions on Power Electronics* 24(2):426-433, Feb. 2009.
Notice for Reasons for Rejections from the Japanese Patent Office with English Translation, dated Apr. 18, 2016, for corresponding Japanese Application No. 2015-531290, 5 pages.
Ou et al., "Magnetic Feedback Ranks High in Military Converters," *Power Electronics Technology:* Jul. 14-19, 2005.
International Search Report and Written Opinion of the International Searching Authority, dated May 31, 2016, for corresponding International Application No. PCT/US2016/018628, 12 pages.
International Search Report and Written Opinion of the International Searching Authority, dated Jun. 21, 2016, for corresponding International Application No. PCT/US2016/019520, 14 pages.
International Search Report, dated Aug. 12, 2002, for PCT/US01/50033, 1 pages.
International Search Report, dated Jun. 8, 2011, for PCT/US2010/052705, 3 pages.
International Search Report, dated Jun. 8, 2011, for PCT/US2010/052707, 3 pages.
Kuehny et al., "Output Filter for Use With Power Converters, for Example DC/DC Power Converters, for Instance Interpoint MFP POL DC/DC Power Converters," U.S. Appl. No. 61/547,327, filed Oct. 14, 2011, 14 pages.
Lam et al., "Dynamic Sharing Average Current Mode Control for Active-Reset and Self-Driven Synchronous Rectification for Power Converters," U.S. Appl. No. 15/178,968, filed Jun. 10, 2016, 39 pages.
International Search Report and Written Opinion, dated Oct. 12, 2016, for corresponding International Application No. PCT/US2016/042582, 11 pages.
Lam et al., "Dynamic Sharing Average Current Mode Control for Active-Reset and Self-Driven Synchronous Rectification for Power Converters," Amendment filed Feb. 15, 2017 for U.S. Appl. No. 15/178,968, 22 pages.
Lam et al., "Proactively Operational Over-Voltage Protection Circuit," U.S. Appl. No. 15/374,116, filed Dec. 9, 2016, 32 pages.
Lam et al., "Proactively Operational Over-Voltage Protection Circuit," U.S. Appl. No. 15/376,329, filed Dec. 12, 2016, 32 pages.
Office Action dated Nov. 18, 2016 for U.S. Appl. No. 15/178,968, Lam et al., "Dynamic Sharing Average Current Mode Control for Active-Reset and Self-Driven Synchronous Rectification for Power Converters," 20 pages.
European Search Report, dated Jul. 5, 2017, for EP Application No. 15822324.8-1804/3170057, 11 pages.
Garcia et al., "Optimal Design for Natural Convection-Cooled Rectifiers," 18th International Telecommunications Energy Conference, Boston, Oct. 6-10, 1996, 10 pages.
International Search Report and Written Opinion, dated Aug. 18, 2017, for International Application No. PCT/US2017/035932, 12 pages.
Notice of Allowance, dated Jul. 28, 2017, for U.S. Appl. No. 15/178,968, Lam et al., "Dynamic Sharing Average Current Mode Control for Active-Reset and Self-Driven Synchronous Rectification for Power Converters," 5 pages.

\* cited by examiner

DYNAMIC MANEUVERING CONFIGURATION FOR MULTIPLE CONTROL MODES IN A UNIFIED SERVO SYSTEM

BACKGROUND

Technical Field

The present disclosure relates to control systems for power electronics devices.

Description of the Related Art

Generally, power supply/converter applications require the power supply to operate within a well-defined operating area bounded by various electrical limits (e.g., voltage, current, power, resistance and conductance). The operation of power supplies may be controlled to operate within an operating area to either protect the power supply, protect a load coupled to the power supply, or for some desired control effect. Depending upon the application, the power supply may, for example, be required to provide a constant power output that does not exceed a specified current limit. Further, some power supply applications require the power supply to be capable of effectively switching between operating modes. For example, some power supplies may switch between providing a constant voltage to providing a constant current.

Figure 1:
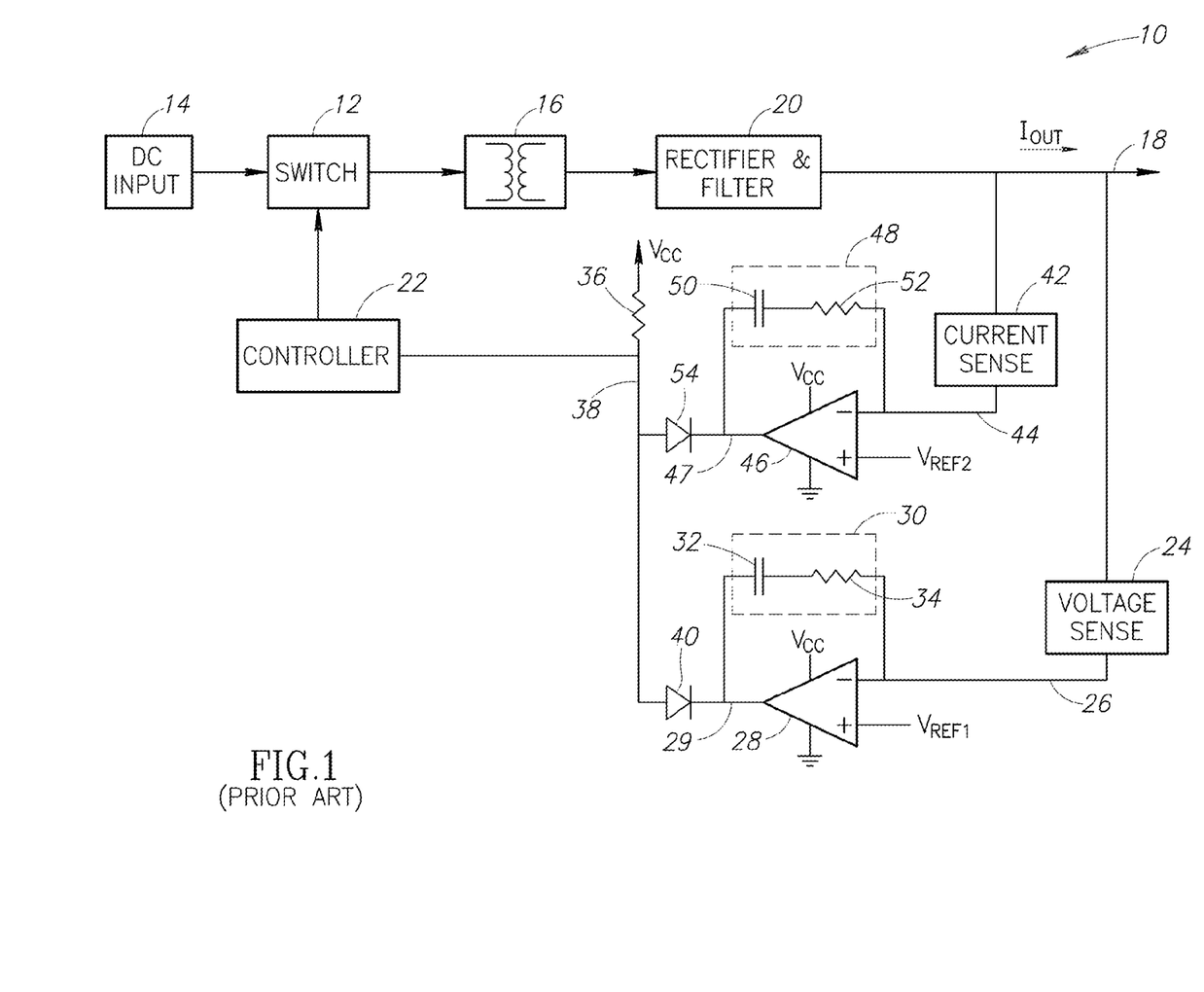
FIG. 1 is a block diagram of a conventional power converter.

FIG. 1 shows a simplified schematic diagram of a DC/DC power converter 10. The power converter 10 operates by repeatedly opening and closing a power switch 12. The switch 12 may, for example, be a metal oxide semiconductor field-effect transistor (MOSFET). In some implementations, closing the switch 12 causes a current to flow from a direct current (DC) input source 14 through a winding of a magnetizable part 16 (e.g., a primary winding of a transformer, an inductor). In one example, a rough DC voltage is present between terminals of the switch 12. In another example, an alternating current (AC) line voltage may, for example, be rectified by a bridge rectifier (not shown) and an associated smoothing capacitor (not shown) to provide rectified and smoothed rough DC voltage to the terminals of the switch.

When the switch 12 is closed, the current that flows through the magnetizable part 16 may cause energy to be stored in the magnetizable part. The switch 12 is then opened. When the switch 12 is opened, energy stored in the magnetizable part 16 is transferred to an output node 18 of the power converter through a rectifier and output filter 20 (e.g., a diode and a capacitor). The current may charge the output filter 20. In steady state operation in a constant voltage (CV) mode, the switch 12 may be switched to open and close rapidly and in such a manner that the output voltage $V_{OUT}$ on the output filter 20 at the output node 18 remains substantially constant.

The power converter 10 includes a controller 22 that controls the opening and closing of the switch 12. For example, the controller 22 may take the form of a pulse width modulation (PWM) controller.

The power converter 10 operates in two control modes that utilize servo feedback control: constant voltage (CV) mode and constant current (CC) mode. In the CV operational mode, the output voltage $V_{OUT}$ is sensed by a voltage sense circuit 24 (e.g., a resistor divider). An output node 26 of the voltage sense circuit 24 is coupled to an inverting input terminal of a voltage control amplifier 28. The voltage control amplifier 28 may be coupled to a positive power supply and a negative power supply (e.g., $V_{CC}$ and ground, $+V_{CC}$ and $-V_{CC}$, etc.). The voltage control amplifier 28 compares the voltage at the output node 26 of the voltage sense circuit to a reference voltage $V_{REF1}$ coupled to a non-inverting input terminal and outputs the result of the comparison onto an output terminal of the voltage control amplifier 28 at node 29 ($V_{EA}$).

A feedback compensation circuit 30 is coupled between the inverting input terminal of the voltage control amplifier 28 and the output terminal. The feedback compensation circuit 30 includes a compensation or feedback capacitor 32 and a feedback resistor 34 connected together in series. If the comparison of the voltage control amplifier 28 inverting input is lower than its non-inverting input (i.e., $V_{OUT}$ is below regulation), then the output voltage of the amplifier 28 will increase to the required voltage at the common control node 38 to maintain regulation of $V_{OUT}$. If the comparison of the amplifier 28 inverting input is greater than its non-inverting input (i.e., $V_{OUT}$ is above regulation), then the output voltage of the amplifier 28 will decrease to the required voltage at the common control node 38 to maintain regulation of $V_{OUT}$. In both cases, this error voltage ($V_{CONTROL}$) at the common control node 38 is indicative of the output voltage $V_{out}$ at the output node 18. The pull-up resistor 36 provides the sourcing current for the amplifier 28. An input of the controller 22 is coupled to the common control node 38 and, based on the received error voltage, the controller controls the on/off duty cycle of the switch 12 to regulate output voltage $V_{OUT}$.

In the CC operational mode, the current $I_{OUT}$ being supplied by the power converter 10 is sensed by a current sense circuit 42 (e.g., a sense resistor). The voltage on an output node 44 of the current sense circuit 42 is sensed by a current control amplifier 46. The current control amplifier 46 may be coupled to a positive power supply and a negative power supply (e.g., $V_{CC}$ and ground, $+V_{CC}$ and $-V_{CC}$, etc.).

A feedback compensation circuit 48 is coupled between the inverting input terminal of the voltage control amplifier 46 and the output terminal at node 47 ($V_{CA}$). The feedback compensation circuit 48 includes a compensation or feedback capacitor 50 and a feedback resistor 52 connected together in series.

If the voltage output by the current sense circuit 42 is greater than a predetermined value, then the current control amplifier 46 causes the voltage on an output terminal thereof to decrease to a relatively low voltage as necessary at the common control node 38 ($V_{CONTROL}$) to maintain the predetermined limit of the output load $I_{OUT}$. The pull-up resistor 36 provides the sourcing current for the amplifier 46. The voltage sensed by the controller 22 is therefore indicative of the magnitude of the output current $I_{OUT}$. Based on the common control node 38 voltage, the controller controls the on/off duty cycle of switch 12 to regulate output current $I_{OUT}$.

In this example, the blocking diodes 40 and 54 are configured such that a minimum error signal is selected and provided to the controller 22. Thus, the diodes may be referred to as being in an "ORed" or "ORing" configuration.

The power converter 10 operates either in the CV mode or in the CC mode, depending on the loading condition. In one example, if the output current exceeds a specified current (e.g., a short circuit or other overcurrent condition), then the power converter 10 operates in the constant current mode. Otherwise, the power converter 10 operates in the constant voltage mode. Thus, in this example, the CC mode acts as a current limiter to protect one or more components of the power converter, such as the switch.

In the power converter 10 of FIG. 1, during transitions between modes of operation (e.g., transition from CV to CC mode), undesirable transients may occur. In particular, during a short circuit condition at the output node 18, high transient input current may occur that can damage the switch 12 or other circuitry. Further, excessive input current ripple and output voltage ripple can occur during startup of the power converter 10, especially when delivering power to a capacitive load.

BRIEF SUMMARY

A review of the schematic diagram of FIG. 1 reveals why the transitions between the two control modes cause the aforementioned transients. When in the CV mode, the output voltage of the voltage control amplifier 28 is at a relatively low regulation point (e.g., a few volts). The output voltage of the current control amplifier 46, which is not in control, is very close to the positive power supply rail $V_{CC}$ (e.g., five volts). When control switches from the voltage control amplifier 28 to the current control amplifier 46, for example, the output voltage of the current control amplifier must swing down from near $V_{CC}$ to the much lower regulation point voltage.

This "swing" is delayed by several factors. One relatively minor factor is the intrinsic delay of the operational amplifier working at its limit (e.g., close to the +$V_{CC}$ rail). Another relatively minor factor is the effective slew rate of the operational amplifier. A relatively major factor is the time necessary to charge or discharge the local feedback capacitors 32 and 50 to the new output voltage of the respective amplifiers 28 and 46 after control is switched between modes. In some examples, discharging the feedback capacitors 32 and 50 can take several clock cycles (e.g., 50 clock cycles or more at a 550 kHz switching frequency), causing a significant delay in the handoff between control modes, resulting in an extended period of uncontrolled energy applied to one or more components, such as the switch 12. This delay can cause high transient input current and voltages (e.g., drain voltage) that can potentially damage the switch 12 or other components of the power converter 10.

A control circuit to control the operation of a power electronics device may be summarized as including a common control node; a first sub-control circuit that includes: a first amplifier that includes a first input, a second input, and an output; a first capacitive feedback circuit that includes an input coupled to the common control node and an output coupled to the first input of the first amplifier; and a first switch that includes a first terminal and a second terminal, the first terminal coupled to the output of the first amplifier and the second terminal coupled to the common control node; and a second sub-control circuit that includes: a second amplifier that includes a first input, a second input, and an output; a second capacitive feedback circuit that includes an input coupled to the common control node and an output coupled to the first input of the second amplifier; and a second switch that includes a first terminal and a second terminal, the first terminal coupled to the output of the second amplifier and the second terminal coupled to the common control node.

The control circuit may further include a first reference voltage supply coupled to the second input of the first amplifier; and a second reference voltage supply coupled to the second input of the second amplifier. The first reference voltage supply may provide a voltage indicative of a reference output voltage for the power electronics device, and the second reference voltage supply may provide a voltage indicative of a reference output current for the power electronics device.

The control circuit may further include a controller that includes a control input, the control input electrically coupled to the common control node.

The control circuit may a voltage sense circuit that includes an output indicative of an output voltage of the power electronics device, the output coupled to the first input of the first amplifier; and a current sense circuit that includes an output indicative of an output current of the power electronics device, the output coupled to the first input of the second amplifier. The first switch may be in the form of a first diode and the second switch may be in the form of a second diode. The first terminal of the first switch may include a cathode of the first diode and the second terminal of the first switch may include an anode of the first diode, and the first terminal of the second switch may include a cathode of the second diode and the second terminal of the second switch may include an anode of the second diode.

The control circuit may further include a third sub-control circuit that includes: a third amplifier that includes a first input, a second input, and an output; a third capacitive feedback circuit that includes an input coupled to the common control node and an output coupled to the first input of the third amplifier; and a third switch that includes a first terminal and a second terminal, the first terminal coupled to the output of the third amplifier and the second terminal coupled to the common control node.

A control circuit to control the operation of a power electronics device may be summarized as including a common control node; a first sub-control circuit that includes: a first forward control portion that includes a first forward control portion input and a first forward control portion output; a first feedback portion that includes a first feedback portion input coupled to the common control node and a first feedback portion output coupled to the first forward control portion input, the first feedback portion stores an electrical charge; and a first switch that includes a first terminal and a second terminal, the first terminal coupled to the first forward portion output and the second terminal coupled to the common control node; and a second sub-control circuit that includes: a second forward control portion that includes a second forward control portion input and a second forward control portion output; a second feedback portion that includes a second feedback portion input coupled to the common control node and a second feedback portion output coupled to the second forward control portion input, the second feedback portion stores an electrical charge; and a second switch that includes a first terminal and a second terminal, the first terminal coupled to the second forward portion output and the second terminal coupled to the common control node. At least one of the second feedback portion and the first feedback portion may include a capacitor. The first switch is in the form of a first diode and the second switch may be in the form of a second diode.

The first terminal of the first switch may include a cathode of the first diode and the second terminal of the first switch may include an anode of the first diode, and the first terminal of the second switch may include a cathode of the second diode and the second terminal of the second switch may include an anode of the second diode. At least one of the first switch or the second switch may include a transistor. During operation of the power electronics device, one of the first switch and the second switch may be opened and the other of the first switch and the second switch may be closed.

The control circuit may further include a third sub-control circuit that includes: a third forward control portion that includes a third forward control portion input and a third forward control portion output; a third feedback portion that includes a third feedback portion input coupled to the common control node and a third feedback portion output coupled to the third forward control portion input, the third feedback portion stores an electrical charge; and a third switch that includes a first terminal and a second terminal, the first terminal coupled to the third forward portion output and the second terminal coupled to the common control node. The first forward control portion may include a first amplifier and the second forward control portion may include a second amplifier.

The control circuit may further include a voltage sense circuit that includes an output indicative of an output voltage of the power electronics device, the output coupled to the first forward control portion input; and a current sense circuit that includes an output indicative of an output current of the power electronics device, the output coupled to the second forward control portion input. The power electronics device may include a power converter, and the common control node may be electrically coupled to an input of a controller for the power converter.

A control circuit to control the operation of a power electronics device may be summarized as including a common control node; a plurality of sub-control circuits, each of the plurality of sub-control circuits includes an output selectively coupled to the common control node via a respective one of a plurality of switches, one of plurality of switches closes at a time, and each of the sub-control circuits include a capacitive feedback circuit having a feedback input electrically coupled to the common control node.

The control circuit may further include a first reference voltage supply coupled to an input of a first one of the plurality of sub-control circuits; and a second reference voltage supply coupled to an input of a second one of the plurality of sub-control circuits. The first reference voltage supply may provide a voltage indicative of a reference output voltage for the power electronics device, and the second reference voltage supply may provide a voltage indicative of a reference output current for the power electronics device.

The control circuit may further include a controller that includes a control input, the control input electrically coupled to the common control node.

The control circuit may further include a first parameter sense circuit that includes an output indicative of a first parameter of the power electronics device, the output coupled to an input of a first one of the plurality of sub-control circuits; and a second parameter sense circuit that includes an output indicative of a second parameter of the power electronics device, the output coupled to an input of a second one of the plurality of sub-control circuits. At least one of the first parameter or the second parameter may include an output voltage, an output current, or a temperature of a component of the power electronics device. At least one of the plurality of switches may be in the form of a diode or a transistor.

A method of controlling a power electronics device may be summarized as including providing a common control node; coupling the common control node to a controller of the power electronics device; and for each of a plurality of sub-control circuits, coupling an output of the sub-control circuit to the common control node via a switch; and coupling a feedback input of a capacitive feedback circuit to the common control node.

The method may further include providing a first control signal from a first one of the sub-control circuits to the controller via the common control node by closing a first one of the switches associated with the first one of the sub-control circuits; opening the first one of the switches associated with the first one of the sub-control circuits; and closing a second one of the switches associated with a second one of the plurality of sub-control circuits to provide a second control signal from the second one of the plurality of sub-control circuits to the controller via the common control node.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with power electronics have not been shown or described in detail to avoid unnecessarily obscuring descriptions of the embodiments.

Unless the context requires otherwise, throughout the specification and claims that follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is, as meaning "and/or" unless the content clearly dictates otherwise.

The headings and Abstract of the Disclosure provided herein are for convenience only and do not interpret the scope or meaning of the embodiments.

Embodiments of the present disclosure are directed to systems and methods for facilitating accelerated handover time between servo control modes for power electronics devices, such as DC/DC power converters, AC/DC power converters, etc. One or more embodiments disclosed herein reduce or eliminate high transient input current that would otherwise occur during overcurrent conditions, such as short circuit conditions. One or more embodiments may also reduce or eliminate excessive input current ripple and output voltage ripple during startup of a power converter, especially when providing power to a capacitive load, which tends to otherwise cause overshoot or "ringing" at startup.

Figure 2:
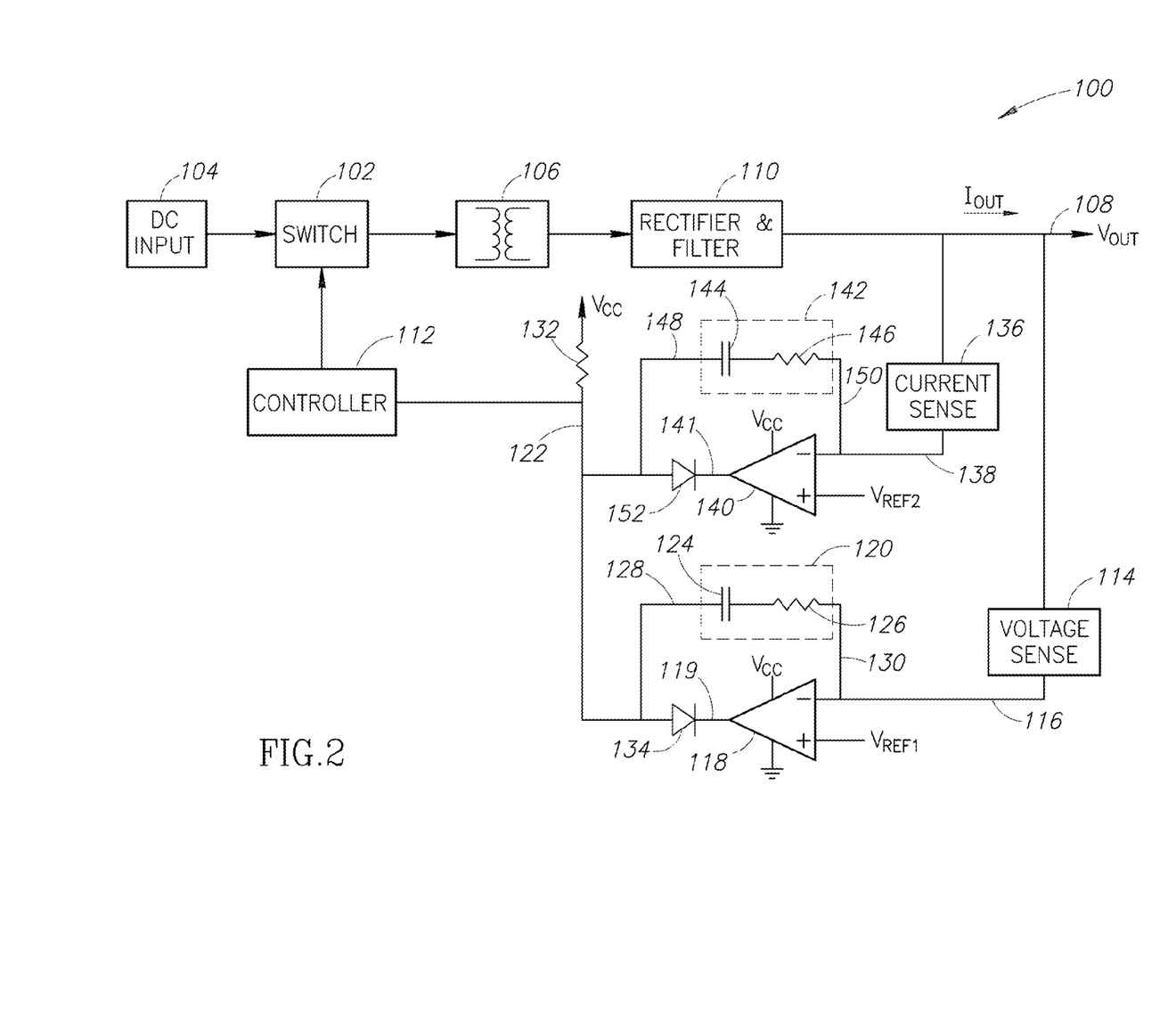
FIG. 2 is a block diagram of a power converter that includes two control inputs that dynamically control a servo system, and control circuitry to accelerate handoff between the two control inputs, according to at least one illustrated embodiment.

FIG. 2 shows a power converter 100 that exhibits significantly improved behavior by minimizing transients appearing at the input and output when control of the power converter changes from one control mode to another. In the illustrated embodiment, the power converter 100 operates by repeatedly opening and closing a power switch 102. The switch 102 may, for example, take the form of a metal oxide semiconductor field-effect transistor (MOSFET), a bipolar junction transistor (BJT), one or more diodes, etc. In some embodiments, the power converter 100 may include a plurality of switches 102 (e.g., two switches used in a push-pull converter). The power converter 100 may take the form of a boost converter, buck converter, buck-boost converter, flyback converter, or any other DC/DC, AC/DC, DC/AC, or AC/AC circuits.

In some implementations, closing the switch 102 causes a current to flow from a direct current (DC) input source 104 through a winding of a magnetizable part 106, such as a primary winding of transformer or through an inductor. In one example, a rough DC voltage is present between two terminals of the switch 102. In another example, an alternating current (AC) line voltage may, for example, be rectified by a bridge rectifier (not shown) and an associated smoothing capacitor (not shown) to provide rectified and smoothed rough DC voltage to the terminals of the switch 102.

When the switch 102 is closed, the current that flows through the magnetizable part 106 causes energy to be stored in the magnetizable part. The switch 102 is then opened. When the switch 102 is opened, energy stored in magnetizable part 106 is transferred to an output node 108 of the power converter 100 in the form of current that flows through a rectifier and output filter 110 (e.g., a diode and a capacitor). The current may charge the output filter 110. In steady state operation in a constant voltage (CV) mode, the switch 102 may be switched to open and close rapidly and in such a manner that an output voltage $V_{OUT}$ on the output filter 110 at the output node 108 remains substantially constant.

The power converter 100 includes a controller 112 that controls the opening and closing of the switch 102. The controller 112 may be coupled to a switch driver (not shown). In some embodiments, the controller 112 is a pulse width modulation (PWM) controller, for example. PWM is a modulation technique that controls the width of a control pulse based on modulator signal information. The average value of voltage (and current) fed to a load at the output node 108 is controlled by turning the switch 102 between the DC input source 104 and a load (i.e., the circuit or device that receives the power from the power converter) ON and OFF at a fast pace. Generally, the longer the switch 102 is ON compared to the OFF periods, the higher the power supplied to the load. The switching frequency is generally much faster than what would affect the load. Typical switching frequencies for power converters range from the tens to hundreds of kilohertz (kHz), for example 50-600 kHz.

An advantage of PWM control is that power loss in the switching devices is very low. When a switch is OFF there is practically no current, and when it is ON, there is almost no voltage drop across the switch. Power loss, being the product of voltage and current, is thus in both cases close to zero.

In the CV operational mode, the output voltage $V_{OUT}$ is sensed by a voltage sense circuit 114 (e.g., a resistor divider). An output node 116 of the voltage sense circuit 114 is coupled to an inverting input terminal of a voltage control amplifier 118. The voltage control amplifier 118 may be coupled to a positive power supply and a negative power supply (e.g., $V_{CC}$ and ground, $+V_{CC}$ and $-V_{CC}$, etc.). The voltage control amplifier 118 compares the voltage at the output node 116 of the voltage sense circuit 114 to a reference voltage $V_{REF1}$ coupled to a non-inverting input terminal and outputs the result of the comparison onto an output terminal of the voltage control amplifier 118 at a node 119 ($V_{EA}$).

A feedback compensation circuit 120 is coupled between the inverting input terminal of the voltage control amplifier and a common control node 122. In this illustrated example, the feedback compensation circuit 120 includes a compensation or feedback capacitor 124 and a feedback resistor 126 connected together in series. An input node 128 of the feedback compensation circuit 120 is coupled to the common control node 122 of the power converter 100 and an output node 130 of the feedback compensation circuit is coupled to the inverting input terminal of the voltage control amplifier 118. In other embodiments, different resistor-capacitor (RC) feedback compensation circuits may be utilized to achieve a desired feedback transfer function.

If the comparison of the voltage control amplifier 118 inverting input is lower than its non-inverting input (i.e., $V_{OUT}$ is below regulation), then the output voltage of the amplifier 118 will increase to the required voltage at the common control node 122 to maintain regulation of $V_{OUT}$. If the comparison of the amplifier 118 inverting input is greater than its non-inverting input (i.e., $V_{OUT}$ is above regulation), then the output voltage of amplifier 118 will decrease to the required voltage at the common control node 122 to maintain regulation of $V_{OUT}$. In both cases, this error voltage ($V_{CONTROL}$) at the common control node 122 is indicative of the output voltage $V_{OUT}$. Pull-up resistor 132 provides the sourcing current for the amplifier 118. A control input of the controller 112 is coupled to the common control node 122 and, based on the received error voltage, the controller 112 controls the on/off duty cycle of the switch 102 to regulate the output voltage $V_{OUT}$ at the output node 108.

In the constant-current (CC) operational mode, the current $I_{OUT}$ being supplied by the power converter 100 is sensed by a current sense circuit 136 (e.g., a sense resistor). The voltage on an output node 138 of the current sense circuit 136 is coupled to an inverting input terminal of a current control amplifier 140. The current control amplifier 140 may be coupled to a positive power supply and a negative power supply (e.g., $V_{CC}$ and ground, $+V_{CC}$ and $-V_{CC}$, etc.). The current control amplifier 140 compares the voltage at the output node 138 of the current sense circuit 136 to a reference voltage $V_{REF2}$ coupled to a non-inverting input terminal and outputs the result of the comparison onto an output terminal of the current control amplifier at a node 141 ($V_{CA}$).

A feedback compensation circuit 142 is coupled between the inverting input terminal of the current control amplifier and the common control node 122. The feedback compensation circuit 142 includes a compensation or feedback capacitor 144 and a feedback resistor 146 connected together in series. An input node 148 of the feedback compensation circuit 142 is coupled to the common output node 122 of the power converter 100 and an output node 150 of the feedback compensation circuit is coupled to the inverting input terminal of the current control amplifier 140. In other embodiments, different RC feedback compensation circuits may be utilized to achieve a desired feedback transfer function.

If the voltage output by the current sense circuit 136 is greater than a predetermined value, then the current control amplifier 140 causes the voltage on an output terminal thereof to decrease to a relatively low voltage as necessary at the common control node 122 ($V_{CONTROL}$) to maintain the predetermined limit of the output load $I_{OUT}$. Pull-up resistor 132 provides the sourcing current for the amplifier 140. The voltage sensed by the controller 112 is therefore indicative of the magnitude of the output current $I_{OUT}$. Based on the common control node 122 voltage, the controller 112 controls the on/off duty cycle of switch to regulate output current $I_{OUT}$.

In this example, the blocking diodes 134 and 152 are configured as switches such that a minimum error signal is selected and provided to the controller 112. Thus, the diodes may be referred to as being in an "ORed" or "ORing" configuration. Other passive or active components may be used to achieve the same switching functionality. For example, one or more transistors (e.g., FETs, BJTs, etc.), integrated circuits (e.g., ideal diode circuits), or the like may be used to provide the switching functionality. The control of such switches may be automatic, as in the illustrated embodiment, or one or more switches may be controlled one or more control circuits or control logic.

In the illustrated example, the power converter 100 operates either in the constant voltage mode or in the constant current mode, depending on the loading condition. In one example, if the output current $I_{OUT}$ exceeds a specified current (e.g., a short circuit condition), then the power converter 100 operates in the constant current (CC) mode. Otherwise, the power converter 100 operates in the constant voltage (CV) mode. Thus, in some embodiments the CC mode is used as a current limiter or protection circuit, while the CV mode is used as a "normal" operating mode.

Depending on design/safety requirements, the power converter 100 may contain an isolation mechanism, such as opto-couplers or magnetizable components, to isolate the DC input source from the load.

In the power converter 100 of FIG. 2, the input nodes 128 and 148 of the feedback compensation circuits 120 and 142, respectively, are coupled to the common control node 122, which is coupled to a control input of the controller 112. As discussed below, this configuration dynamically controls the servo signal applied to the common control node 122 dependent on the inputs to the voltage control amplifier 118 and the current control amplifier 140. In some embodiments, the power converter 100 is operative to transition between the CV control mode and the CC control mode within about one clock cycle (e.g., approximately 1.8 microseconds at a 550 kHz clock cycle) opposed to tens of clock cycles (e.g., 90-100 microseconds) required for conventional control circuits.

When the power converter 100 operates in the CV mode, the voltage control amplifier 118 is operating in its linear region and regulating the output voltage ($V_{EA}$) at the output terminal at a relatively low regulation point $V_{CONTROL-CV}$ (e.g., one or two volts). The output voltage ($V_{CA}$) of the current control amplifier 140, which is not in control in the CV mode, is very close to the positive power supply rail $V_{CC}$ (e.g., five volts). Since the feedback capacitors 124 and 144 are both coupled to the common control node 122, each of the feedback capacitors is charged to approximately $V_{EA}$ (e.g., the voltage $V_{CONTROL}$ at the common control node 122 equals $V_{EA}$ plus any voltage drop across the blocking diode 134).

When control switches from the voltage control amplifier 118 to the current control amplifier 140, for example, due to a short circuit condition, the output voltage $V_{CA}$ of the current control amplifier swing downs from near $V_{CC}$ toward a regulation voltage $V_{CONTROL-CC}$ (i.e., $V_{REF2}$) until the blocking diode 152 is conducting and begins to discharge the feedback capacitor 144 while beginning to control the voltage $V_{CONTROL}$ at the common control node 122. This is due to the increase in the voltage at the output node 138 of the current sense circuit 136 caused by the increase in output current $I_{OUT}$. Unlike conventional control circuits wherein the feedback capacitor 144 is charged fully to $V_{CC}$, prior to the mode transition the feedback capacitor 144 is only charged to the regulation voltage $V_{CONTROL}$ at the common control node (e.g., approximately the output voltage $V_{EA}$). This allows the feedback capacitor 144 to be discharged much more rapidly (e.g., within about one clock cycle at a 550 kHz clock cycle).

During the transition from the CV mode to the CC mode, the output voltage $V_{EA}$ of the voltage control amplifier 118 swings up from $V_{EA}$ to $V_{CC}$, thereby reverse biasing the blocking diode 134. Thereafter the output load current $I_{OUT}$ is controlled by the output voltage $V_{CA}$ at the output terminal of the current control amplifier 140.

During recovery from an overcurrent condition (e.g., a short circuit condition is removed), the output voltage $V_{CA}$ of the current control amplifier 140 begins to swing to $V_{CC}$. The output voltage $V_{EA}$ of the voltage control amplifier 118 begins to swing down from $V_{CC}$ to a regulation voltage $V_{CONTROL-CV}$ (i.e., $V_{REF1}$). The transition from the CC mode to the CV mode provides a full "soft startup" such that the output voltage does not overshoot during startup or recovery from an overcurrent condition.

Figure 3A:
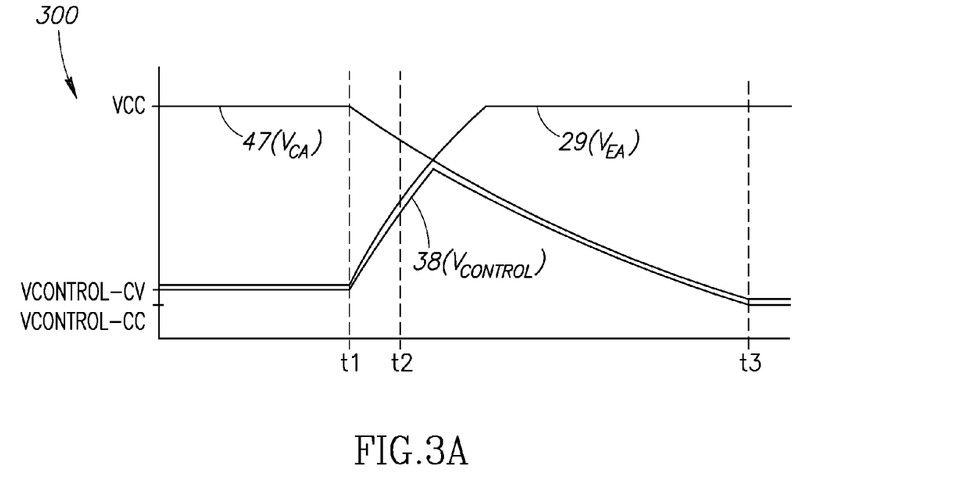
FIG. 3A is a graph of an output voltage ($V_{CA}$) for a current control amplifier of the conventional power converter of FIG. 1, an output voltage ($V_{EA}$) for a voltage control amplifier of the conventional power converter, and a common control node voltage ($V_{CONTROL}$) of the power converter during a transition from a constant voltage control mode to a constant current control mode.
Figure 3B:
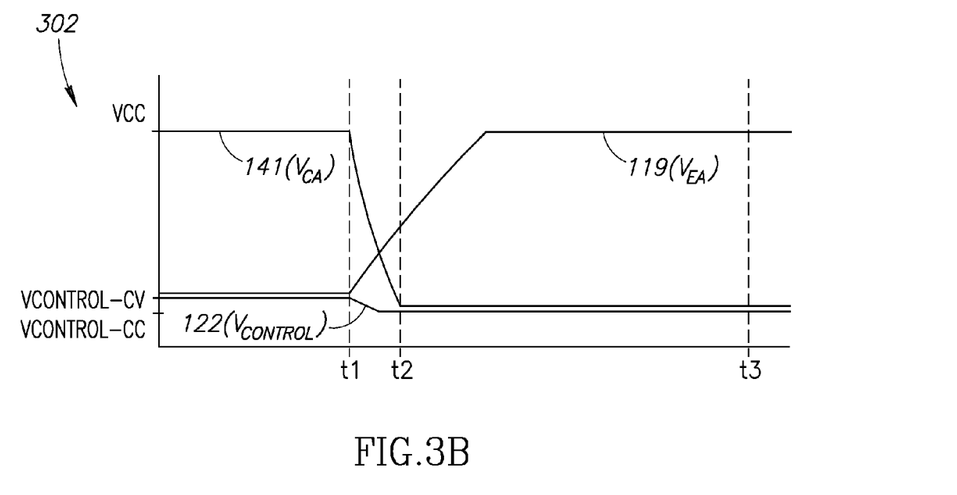
FIG. 3B is a graph of an output voltage ($V_{CA}$) for a current control amplifier of the power converter of FIG. 2, an output voltage ($V_{EA}$) for a voltage control amplifier of the power converter, and a common control node voltage ($V_{CONTROL}$) of the power converter during a transition from a constant voltage control mode to a constant current control mode.

FIG. 3A shows a graph 300 of the current control output voltage 47 ($V_{CA}$) for the conventional power converter 10 (FIG. 1), the voltage control output voltage 29 ($V_{EA}$) for the conventional power converter, and the common control node voltage 38 ($V_{CONTROL}$) for the power converter during a transition from the CV mode to the CC mode that occurs at a time $t_1$. FIG. 3B shows a graph 302 of the current control output voltage 141 ($V_{CA}$) for the power converter 100 (FIG. 2), the voltage control output voltage 119 ($V_{EA}$) for the power converter, and the common control node voltage 122 ($V_{CONTROL}$) for the power converter during a transition from the CV mode to the CC mode that occurs at a time $t_1$.

As shown in FIG. 3B, when control switches from the voltage control amplifier 118 (FIG. 2) to the current control amplifier 140 at time $t_1$, the output voltage 141 ($V_{CA}$) of the current control amplifier 140 swing downs from near $V_{CC}$ to a regulation voltage $V_{CONTROL-CC}$ to control the voltage ($V_{CONTROL}$) at the common control node 122 (FIG. 2). During the transition, the output voltage 119 ($V_{EA}$) of the voltage control amplifier 118 swings up from $V_{CONTROL-CV}$ to near $V_{CC}$.

Prior to the mode transition, the feedback capacitor 144 is charged to the voltage $V_{CONTROL}$ at the common control node 122, which is approximately the regulation voltage of the voltage control amplifier $V_{CONTROL-CV}$ (FIG. 3B). After the transition, the feedback capacitor 144 is discharged to the output voltage 141 ($V_{CA}$) of the current control amplifier 140, which in this example is slightly lower than the output voltage of the voltage control amplifier 118, $V_{CONTROL-CV}$. As shown, since the feedback capacitor 144 is only discharged from the voltage regulation point $V_{CONTROL-CV}$ to the current regulation point $V_{CONTROL-CC}$, the feedback capacitor is discharged by time $t_2$, which may be less than a few clock cycles (e.g., one clock cycle, or less).

In contrast, as shown in FIG. 3A, the voltage across a feedback capacitor of a conventional feedback compensation circuit that has been charged to $V_{CC}$ prior to the mode transition may not be discharged until a later time $t_3$, which is substantially longer than the time required to discharge the feedback capacitor (i.e., $t_3-t_1$ versus $t_2-t_1$). Thus, the current control output voltage 47 ($V_{CA}$) takes a relatively long time to fall from $V_{CC}$ down to $V_{CONTROL-CC}$. As noted above, the time required to discharge a feedback capacitor in a conventional feedback compensation circuit may be on the order of tens of clock cycles (e.g., 90-100 microseconds for a 550 kHz clock). By substantially reducing the change in voltage across the feedback capacitor 144 that occurs during transitions between control modes, the power converter 100 operates "uncontrolled" for a relatively short duration, which significantly reduces undesirable transient inrush current and transient output voltages.

Figure 4:
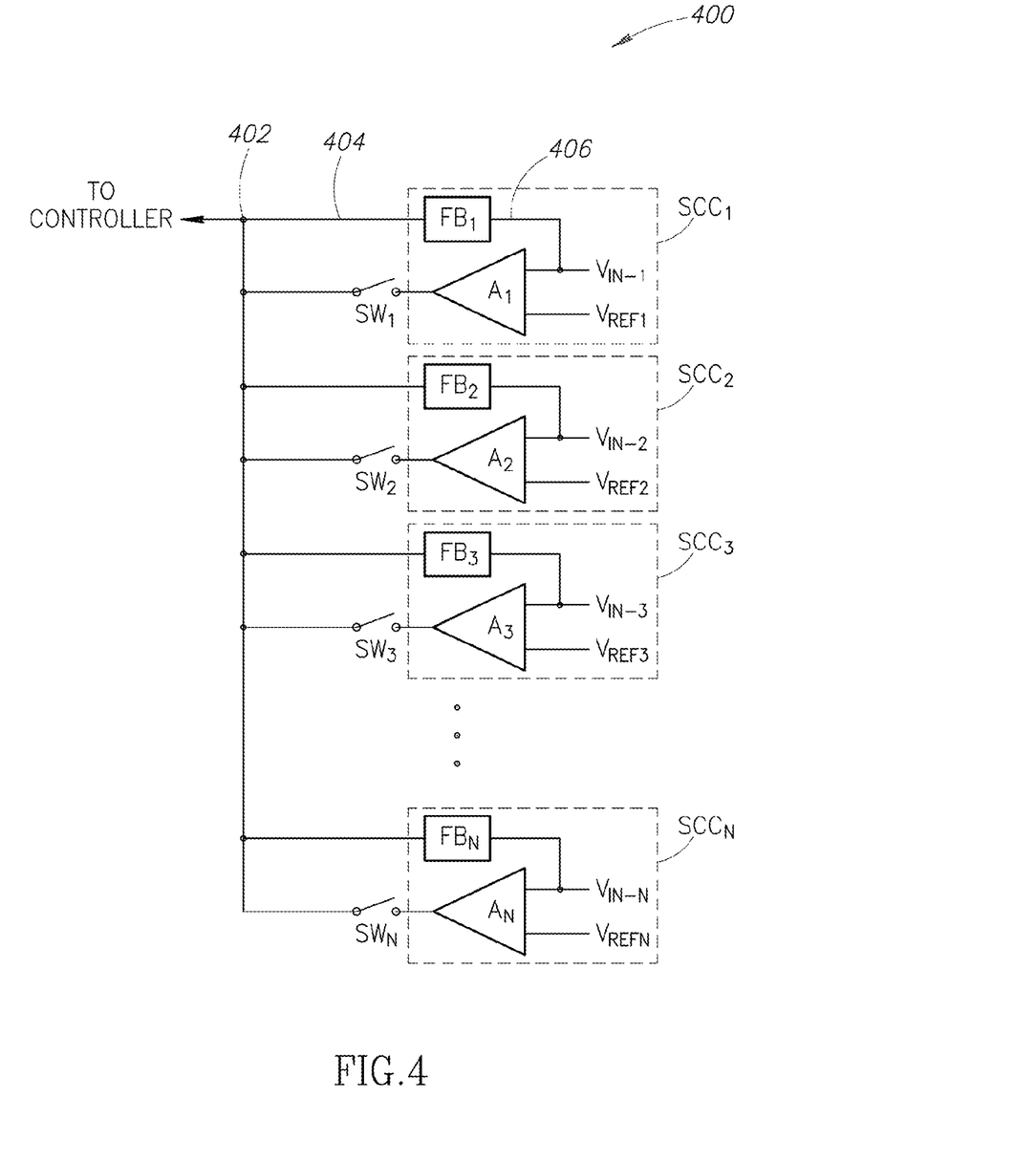
FIG. 4 is a block diagram of a control circuit that controls the operation of a power electronics device, according to at least one illustrated embodiment.

FIG. 4 shows a block diagram of a control circuit 400 that may be utilized to provide multiple control inputs to a power electronics device or system, such as a power converter, etc. The control circuit 400 includes a common control node 402 that may be coupled to an input of a controller, such as the controller 112 of FIG. 2.

The control circuit 400 also includes N sub-control circuits $SCC_{1-N}$ (generally "SCC"). Each of the sub-control circuits $SCC_{1-N}$ includes a respective amplifier $A_{1-N}$, such as an operational amplifier, comparator, transistors, etc. Generally, each of the sub-control circuits SCC may include a forward control circuit (e.g., amplifiers $A_{1-N}$). A first input terminal of each of the amplifiers $A_{1-N}$ is coupled to respective reference voltages $V_{REF1-N}$. A second input terminal of each of the amplifiers $A_{1-N}$ is coupled to a respective input voltage signal $V_{IN-1} \ldots V_{IN-N}$. The input voltage signals $V_{IN}$ may provide a signal indicative of one or more parameters of a device including, but not limited to, output voltage, output current, output power, input voltage, input current, input power, temperature of a component (e.g., critical junction temperature), and the like.

An output terminal of each of the amplifiers $A_{1-N}$ is coupled to a first terminal of respective switches $SW_{1-N}$. A second terminal of each of the switches $SW_{1-N}$ is coupled to the common control node 402, such that each of the output terminals of the amplifiers $A_{1-N}$ may be selectively coupled to the common control node when the switch $SW_{1-N}$ associated with the amplifier is closed. The switches $SW_{1-N}$ may be formed from one or more diodes (see FIG. 2), one or more MOSFETS, one or more BJTs, one or more integrated circuits, or any other active or passive components.

Each of the sub-control circuits $SCC_{1-N}$ further include respective feedback networks or circuits $FB_{1-N}$ that have input terminals 404 coupled to the common control node 402 and output terminals 406 coupled to an input terminal of the respective amplifier $A_{1-N}$. The feedback circuits $FB_{1-N}$ may each include at least one capacitive element, such as the feedback capacitors 124 and 144 of FIG. 2.

In operation, one of the switches $SW_{1-N}$ is closed at a particular time so that its respective sub-control circuit $SCC_{1-N}$ controls the voltage on the common control node 402 that is provided as a control signal to the controller (see FIG. 2). The control circuit 400 may transition between control modes by opening the one of the switches SW that is closed and closing another of the switches so that its respective sub-control circuit SCC may control the voltage on the common control node 402. Since the input nodes 404 of each of the feedback circuits $FB_{1-N}$ are tied to the common control node 402, the components (e.g., capacitors) of the feedback circuits are biased to a regulation voltage instead of a power rail voltage. Thus, as discussed above with reference to FIGS. 2 and 3, the time required to handover from one sub-control circuit SCC to another is minimized since the change in voltage across the components is greatly reduced. As discussed above, by tying the input nodes 404 of the feedback circuits $FB_{1-N}$ to the common control node 402, transitions between control modes may be implemented within a very short duration, such as a few clock cycles, or less.

Figure 5:
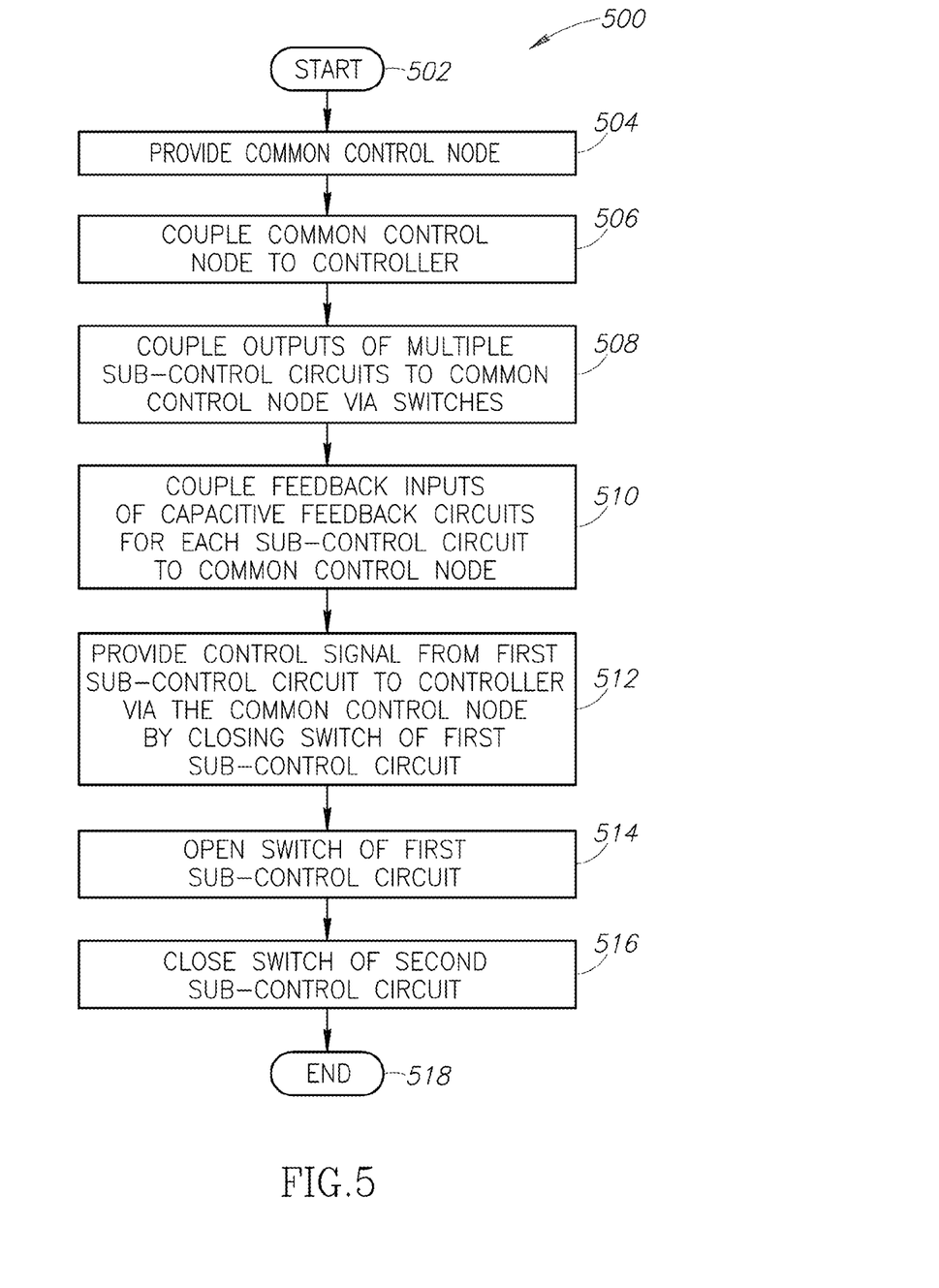
FIG. 5 is a flow diagram showing a method for controlling a power electronics device, according to at least one illustrated embodiment.

FIG. 5 shows a method 500 for operating a control circuit to provide multiple control inputs for a power electronics system, such as a power converter. The method 500 begins at 502.

At 504 and 506, a common control node is coupled to a control input of a controller, such as a PWM controller for a power converter. At 508, outputs of multiple sub-control circuits are coupled to the common control via switches that may be selectively opened or closed. As discussed above, the switches may operate autonomously or may be controlled by one or more control circuits or logic. The sub-control circuits may output one or more signals indicative of a device parameter, such as voltage, current, temperature, or the like.

At 510, inputs of capacitive feedback circuits associated with each of the sub-control circuits are each coupled to the common control node. Thus, the components of each of the capacitive feedback circuits are each charged to a common voltage (e.g., the regulation voltage at the common control node).

At 512, a first switch associated with a first one of the sub-control circuits may be closed such that the output of the first sub-control circuit is provided to the controller via the common control node. The controller may utilize the output signal from the first sub-control circuit to control the power electronics system in a first control mode.

At 514, the first switch is opened. At 516, a second switch associated with a second one of the sub-control circuits may be closed such that the output of the second sub-control circuit is provided to the controller via the common control node. The controller may utilize the output signal from the second sub-control circuit to control the power electronics system in a second control mode.

The method 500 terminates at 518. The method 500 repeats continuously or may be executed intermittently. One or more acts of the method 500 may be repeated to dynamically provide multiple control inputs to an electronics system. As discussed above, by coupling inputs of feedback circuits of multiple sub-control circuits to a common control node, the control circuit may rapidly transition between multiple control modes, thereby reducing or eliminating undesirable transients that may occur during the mode transitions.

Advantageously, unlike other methods of accelerating the handover time between control modes, the configuration of the control circuits disclosed herein do not change the gain-phase characteristics of the feedback compensation circuits. For example, modifying the feedback compensation circuits to provide faster response times has proved to cause instability. Further, modifying the feedback compensation circuits to provide faster response times may cause problems during startup, especially when power is delivered to a capacitive load, which tends to cause overshoot or ringing at the output during startup.

Moreover, the control circuits disclosed herein reduce or eliminate inrush current during the incursion of an overcurrent condition and while an electronics device remains in an overcurrent condition. Further, the control circuits disclosed herein provide a full soft startup process for an electronics device that does not produce an overshoot on the output voltage (e.g., $V_{OUT}$ of FIG. 2).

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Those of skill in the art will recognize that many of the methods or algorithms set out herein may employ additional acts, may omit some acts, and/or may execute acts in a different order than specified.

In addition, those skilled in the art will appreciate that the mechanisms taught herein are capable of being distributed as a program product in a variety of forms, and that an illustrative embodiment applies equally regardless of the particular type of nontransitory signal bearing media used to actually carry out the distribution. Examples of nontransitory signal bearing media include, but are not limited to, the following: recordable type media such as floppy disks, hard disk drives, CD ROMs, digital tape, and computer memory.

The various embodiments described above can be combined to provide further embodiments. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

U.S. patent application Ser. No. 14/333,705, filed Jul. 17, 2014 is incorporated herein by reference in its entirety.

The invention claimed is:

1. A control circuit to control the operation of a power electronics device, the control circuit comprising:
a common control node that in operation provides a regulation voltage to the power electronics device; and
a plurality of sub-control circuits, each of the plurality of sub-control circuits includes an output selectively coupled to the common control node via a respective one of a plurality of switches, one of plurality of switches closes at a time, and each of the sub-control circuits includes a capacitive feedback compensation circuit which provides AC compensation for the sub-control circuit, the feedback compensation circuit having a capacitor directly electrically connected to the common control node to bias the capacitor at the regulation voltage of the common control node such that, during a transition of control from a first one of the plurality of sub-control circuits to a second one of the plurality of sub-control circuits, the capacitor for the second one of the plurality of sub-control circuits discharges from the regulation voltage of the common control node.

2. The control circuit of claim 1, further comprising:
a first reference voltage supply coupled to an input of a first one of the plurality of sub-control circuits; and
a second reference voltage supply coupled to an input of a second one of the plurality of sub-control circuits.

3. The control circuit of claim 2 wherein the first reference voltage supply provides a voltage indicative of a reference output voltage for the power electronics device, and the second reference voltage supply provides a voltage indicative of a reference output current for the power electronics device.

4. The control circuit of claim 1, further comprising:
a controller that includes a control input, the control input electrically coupled to the common control node.

5. The control circuit of claim 1, further comprising:
a first parameter sense circuit that includes an output indicative of a first parameter of the power electronics device, the output coupled to an input of a first one of the plurality of sub-control circuits; and
a second parameter sense circuit that includes an output indicative of a second parameter of the power electronics device, the output coupled to an input of a second one of the plurality of sub-control circuits.

6. The control circuit of claim 5 wherein at least one of the first parameter or the second parameter includes an output voltage, an output current, or a temperature of a component of the power electronics device.

7. The control circuit of claim 1 wherein at least one of the plurality of switches is in the form of a diode or a transistor.

8. A method of controlling a power electronics device, the method comprising:
    providing a common control node that in operation provides a regulation voltage;
    coupling the common control node to a controller of the power electronics device; and
    for each of a plurality of sub-control circuits,
        coupling an output of the sub-control circuit to the common control node via a switch; and
        connecting a capacitor of a capacitive feedback compensation circuit directly to the common control node to bias the capacitor at the regulation voltage of the common control node such that, during a transition of control from a first one of the plurality of sub-control circuits to a second one of the plurality of sub-control circuits, the capacitor for the second one of the plurality of sub-control circuits discharges from the regulation voltage of the common control node.

9. The method of claim 8, further comprising:
    providing a first control signal from a first one of the sub-control circuits to the controller via the common control node by closing a first one of the switches associated with the first one of the sub-control circuits;
    opening the first one of the switches associated with the first one of the sub-control circuits; and
    closing a second one of the switches associated with a second one of the plurality of sub-control circuits to provide a second control signal from the second one of the plurality of sub-control circuits to the controller via the common control node.

\* \* \* \* \*